UNITED STATES PATENT OFFICE.

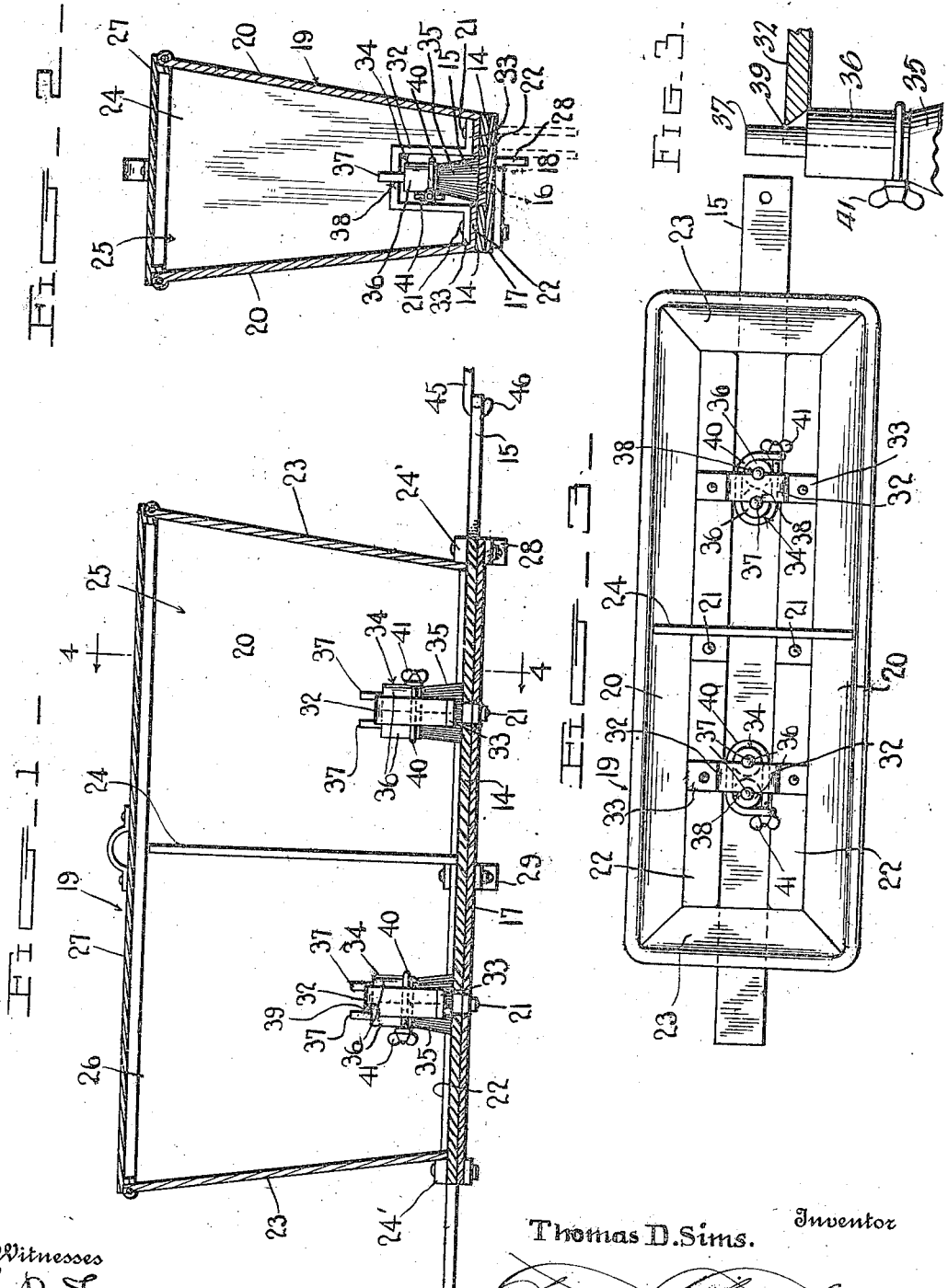# T. D. SIMS.
PLANTER.
APPLICATION FILED JAN. 19, 1911.
1,150,310. Patented Aug. 17, 1915.
Witnesses
L. B. James
Francis Boyle
Inventor
Thomas D. Sims.
By
Attorneys

THOMAS D. SIMS, OF FAYETTEVILLE, TENNESSEE.

PLANTER.

1,150,310.  Specification of Letters Patent.  Patented Aug. 17, 1915.

Application filed January 19, 1911. Serial No. 603,585.

*To all whom it may concern:*

Be it known that I, THOMAS D. SIMS, a citizen of the United States, residing at Fayetteville, in the county of Lincoln, State of Tennessee, have invented certain new and useful Improvements in Planters; and I do hereby declare the following to be a full, clear, and exact description of the invention, such as will enable others skilled in the art to which it appertains to make and use the same.

This invention relates to planters more particularly to that type of planter that will simultaneously drop seeds and fertilizer.

An object of the present invention resides in the provision in a planter hopper of suitable means including brushes whereby grain may be properly fed therefrom.

A further object of the invention is to provide novel adjusting means for the brushes so that the same may be adjusted to vary the amount of grain discharged, this adjusting means further permitting of the brushes being readily removed and replaced with new ones when worn out.

With the above objects in view the invention consists of the novel details of construction and combination of parts hereinafter fully described and claimed, it being understood that various modifications may be made in the minor details of construction within the scope of the appended claim.

In the accompanying drawing forming part of this specification:—Figure 1 is a vertical longitudinal sectional view through the planter hopper, showing the brush supporting means. Fig. 2 is a top plan view of the hopper, with the cover thereof removed, and Fig. 3 is a transverse sectional view through the hopper, taken on the line 4—4 of Fig. 1.

As the structure of the plow or other supporting means is not necessary to a proper disclosure of the invention, only the planter hopper mechanism is shown in the drawings.

The planter comprising the subject matter of this invention is mounted in rear of the plow beam and between the handle bars, and comprises a bottom formed of a pair of spaced parallel flat strips 14 between which is slidingly fitted a slide 15 having a pair of orifices 16 adjacent to its opposite ends which form outlets.

A bottom plate 17 is fixed to the bottom faces of the strips 14 and forms a seat for the slide 15, this bottom plate being provided with a pair of spaced orifices 18 adjacent to its opposite ends which register with the outlets of the slide at certain positions in the movement of the slide. A casing or hopper 19 is mounted on the top faces of the longitudinal guide strips 14 this casing preferably being formed of metal and comprising side walls 20 which incline toward the guide strips and have their lowermost edges bent abruptly and fixed to the top faces of the guide strips, bolts, rivets, or similar connectors 21 being passed vertically through the inturned flanges 22 of the sides, guide strips 14 and bottom plates 17 to rigidly secure the parts together. The end walls 23 of the casing incline inwardly and abut with their lower edges the top faces of the guide strips 14 and seed slide 15. A pair of cross cleats 24' are fixed at their opposite ends to the guide strips and bear against the lower end portion of the casing end walls to anchor the latter against displacement. A vertical partition 24 is arranged within the casing and divides the casing into two approximate equal hoppers, one hopper 25 being designed to receive fertilizer and the other hopper 26 to receive the seed to be planted. A suitable cover 27 bears with its marginal portions against the rim of the casing and forms a closure over both hoppers.

For securing the casing in position an angle iron bracket 28 is fixed to one side of the plow beam and to the bottom face of the bottom plate 17 and a pair of cleats 29 are fixed to the inner faces of the handle bars and bear with their upper edges against the rearmost portion of the bottom plate and coöperate with the angle iron brackets to support the bottom of the casing horizontal.

For regulating the discharge of seed through the outlets in the slide 15, a brushing device is mounted in each hopper and since both devices are identical in construction but one will be described. A yoke 32 is mounted to straddle the slide and is provided with outturned extremities 33 which are fixed to the guide strips. A pair of brushes 34 are mounted within the yoke, the bristles 35 of the brushes bearing on the top face of the slide, and the stocks 36 of the brushes being arranged in abutting contact below the bridge of the yoke. The brush stocks are provided axially with stems 37 that engage in grooves 38 formed in the opposite sides of the yoke bridge. The walls of the grooves are beveled to provide sharp cutting edges 39 which penetrate the stems 37 of the brushes and prevent gravitation of the brushes when adjusted as will hereinafter be described.

A tie clamp 40 formed from a single length of wire or like material is bent to encircle the stocks of both brushes, one end of the tie clamp being provided with an orifice through which the opposite end of the tie member projects, the said opposite end being equipped with a set screw 41 which bears against the orificed end of the clamp and serves to tighten the clamp whereby to securely bind the stocks of the brushes together. When the clamp is tightened it will be observed that the sharpened edges of the yoke grooves penetrate the stems of the brushes. Thus the brushes may be mounted so that their bristles bear directly upon the slide or may be elevated so that their bristles are slightly spaced from the slide, and when in any of their adjusted positions, by virtue of the sharpened edges of the yokes penetrating the brush stems, the brushes will be positively held against gravitation.

When the slide 15 is reciprocated between the guide strips, a portion of both the seed and fertilizer will gravitate into the outlets of the slide and as the slide advances underneath the brushes, the latter will force the seed and fertilizer into the outlets of the bottom plate at the instant of registration of both the outlets in the slide and in the bottom plate. It is clear that when the bristles of the brush bear directly upon the top face of the slide that a lesser amount of both seed and fertilizer will be discharged through the outlets than when the brushes are spaced slightly above the slide. Thus the amount of seed and fertilizer delivered through the delivery pipe is regulated. The slide 15 may be reciprocated by any desired means, preferably a ground wheel, (not shown) a pitman 45 which is provided with the hooked extremity 46 engaging the slide, forming the immediate connection with the slide.

What is claimed, is:—

In a planter, a hopper having an outlet, a slide in said hopper adapted to expose said outlet, an inverted U-shaped strap yoke straddling said slide above said outlet and having notches in the opposite edges of the bridge portion provided with knife edges, bristle brushes bearing upon said slide and having wooden stems fitting in said notches, and having the bristle bearing cylindrical stocks in intimate contact below said bridge portion, and a draw element encircling and clamping said stocks together and serving to force said knife edges into said stems.

In testimony whereof, I affix my signature, in presence of two witnesses.

THOMAS D. SIMS.

Witnesses:
D. M. BRIGHT,
JACOB NEWMAN.